INVENTORS
ANTON KRISTIAN DIESEN
WILLY JOHN HELGE ADENSTEDT
BY Frederick E. Hane
ATTORNEY INVENTORS
ANTON KRISTIAN DIESEN
WILLY JOHN HELGE ADENSTEDT
BY Frederick L. Haag
ATTORNEY INVENTORS
ANTON KRISTIAN DIESEN
WILLY JOHN HELGE ADENSTEDT
BY [signature]
ATTORNEY INVENTORS
ANTON KRISTIAN DIESEN
WILLY JOHN HELGE ADENSTEDT
BY [signature]
ATTORNEY United States Patent Office 2,889,412
Patented June 2, 1959

2,889,412

SEMI-AUTOMATIC TELEPHONE EXCHANGE

Anton Kristian Diesen, Hagersten, and Willy John Helge Adenstedt, Johanneshov, Sweden, assignors to Telefonaktiebolaget L M Ericsson, Stockholm, Sweden, a corporation of Sweden Application June 27, 1956, Serial No. 594,310

Claims priority, application Sweden July 29, 1955

1 Claim. (Cl. 179—27)

This invention relates to a semi-automatic telephone exchange containing a number of manually operable switch boards each connected to several cord circuits. At the operating boards calling and called lines are connected and coupled to multiple jacks for the interconnection of a calling line with the required called line over said cord circuits. The lines have not all the same privileges but among said lines there are a number of particularly marked lines, each provided with a line relay and a cut-off relay for semi-automatic telephone traffic. In the telephone exchange there is furthermore a number of primary and secondary cross bar switches and a number of secondary cross bar switches for connecting a calling, particularly marked line to a called, particularly marked line, over a by-pass, and a common control relay set for the setting of said cross bar switch.

Cord circuits in manually operated boards have normally three-conductor cords and three-conductor plugs. Four-conductor and also six-conductor cord circuits have been used to a certain extent. However, there have always been operational difficulties in the form of a short life for the cords and unsafe contact in the jacks.

It is known, e.g. by the American Patents Nos. 1,647,796 and 2,568,733, to mark certain lines and interconnect them automatically over a by-pass by means of automatic selectors, after they have been combined by means of a three-conductor cord circuit in an operating board. For this purpose there are links, each having two machine driven line finders which each detects one of those two lines which are to be interconnected, all line-finders being able to connect to the required one of the lines particularly marked.

As machine driven selectors are on one hand slow, on the other hand have movable wiper sets, which have high and variable contact resistances, it is desirable to replace them by cross bar switches. Known couplings for cross bar switches involve on one hand a marker, on the other hand devices for identifying those lines which are to be interconnected.

This invention has for its object to produce—by means of a three-conductor cord circuit placed in a switch board, which cord circuit combines two particularly marked lines—an interconnection of the lines over primary and secondary cross bar switches without particular identifying devices and without losing the control of the communication. This is achieved by means of at least one control relay in each board, which is operated when a cord circuit via the board combines two particularly marked lines, a relay chain, in which only one relay at a time may lie operated, containing a calling relay for each operating board, said calling relay being operated in a circuit which is closed when said control relay is operated, contacts on said calling relay, which close signal circuits over the cord circuit for the operation of the line relay of both lines connected by means of the cord circuit and particularly marked, and circuits on one hand for indication of the lines by means of the line relays, on the other hand for starting said marker, whereby the marker sets up a communication between the particularly marked lines over said selectors, and by contacts on the cut-off relays, on one hand for breaking of said circuits for indication and starting, on the other hand for resetting said control relay in the operating board.

The invention will be described more in detail with reference to the annexed drawings, Figs. 1–5, which show the application of the invention for the tandem traffic in a toll exchange.

Figures 5, 6:
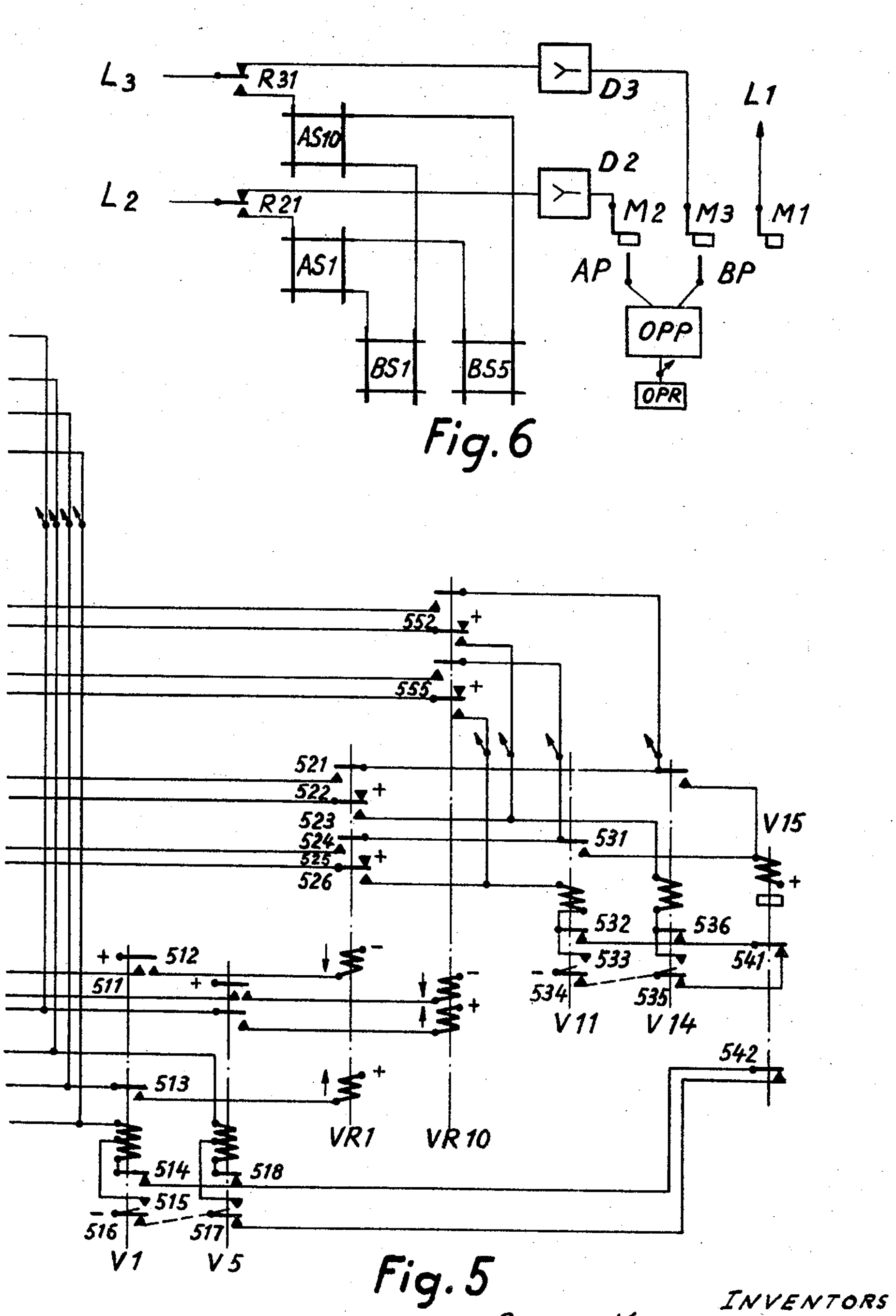
Fig. 5 shows the common relay set for the setting of cross bar switches.
Fig. 6 shows a general view for the toll exchange.

According to Fig. 6 there is a plurality of lines L1—L3 connected to jacks M1—M3 in a number of operating boards OPP having each a number of cord circuits AP—BP. The line L1 is a 2-conductor line and the lines L2—L3 are 4-conductor lines. By means of the cord circuits AP—BP the lines L1—L3 may be interconnected. The 4-conductor lines L2—L3 are provided with differential transformers D2—D3 and may not be interconnected by 4-conductors by means of the cord circuits and they are therefore particularly marked and provided with relay devices R21 and R31, respectively, for the interconnection of the lines over the cross bar switches AS1—AS10, BS1—BS5. In order to make this interconnection possible there is a relay chain OPR with a relay for each operating board OPP.

Figure 1:
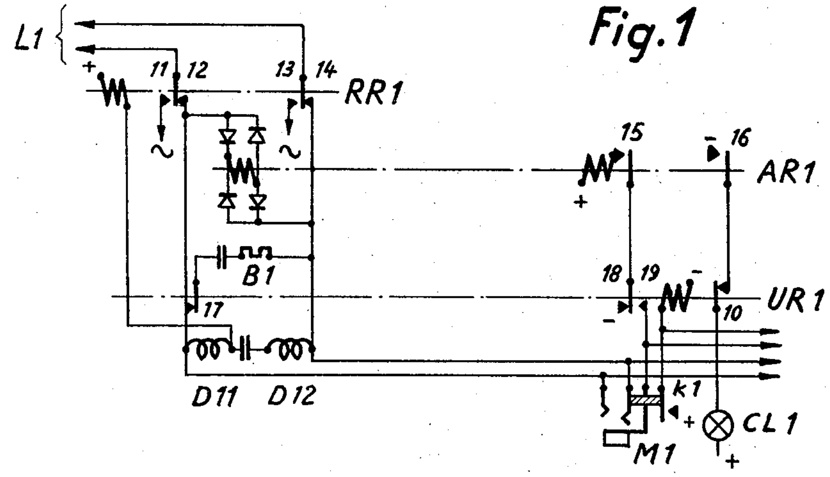
Fig. 1 shows the line equipment for a two-conductor toll line.

In Fig. 1 is M1 a multiple jack and CL1 a calling lamp. The relay AR1 is a relay for calling and clearing and is connected in a rectifier bridge for receiving alternating current signals. The rely UR1 is a cut-off relay, B1 is a terminal impedance and D11—D12 are choke coils. The relay RR1 is a signal relay for the emission of alternating current signals over the line L1 to another toll exchange.

When a calling signal is received from the line L1 the relay AR1 is operated, it operates the contacts 15—16 and is held in a circuit over the contacts 18 and 15 through its right winding. The calling lamp CL1 is ignited. The operator answers by plugging in an answering cord AP in Fig. 3 in the jack M1. The contact *k*1 is closed, the relay UR1 is operated and the contacts 17—19, 10 are actuated. The lamps CL1 are extinguished. The relay AR1 releases its armature, the terminal impedance B1 is disconnected.

Figure 3:
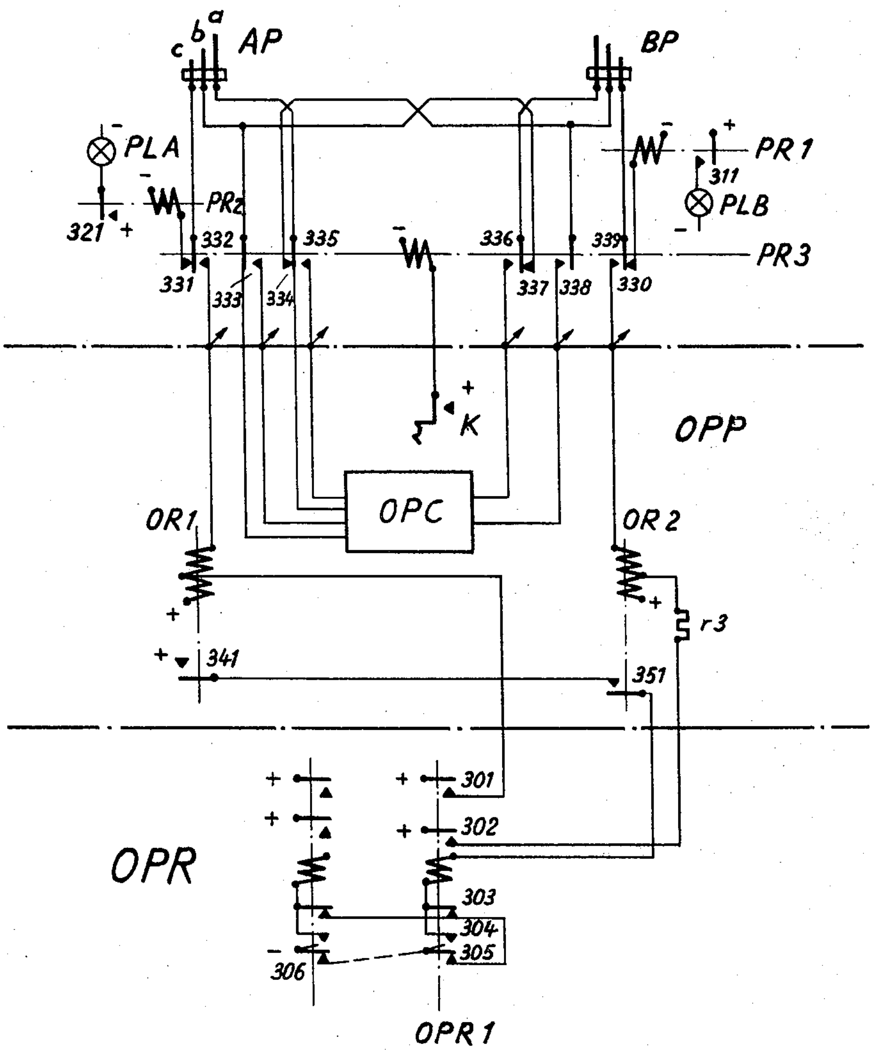
Fig. 3 shows a manually operable board and a cord circuit belonging to it.

When the line L1 is called, the operator plugs in a calling cord BP in Fig. 3 in the jack M1 and connects battery over a ringing key to the *a*-wire, whereby the relay RR1 receives current through the choke D11, it operated and operates the contacts 11—14, an alternating current signal being transmitted over the line L1. No signal over the *b*-wire and the choke D12 is produced in the shown embodiment, but may be provided for the connection and disconnection of an attenuator.

Figure 2:
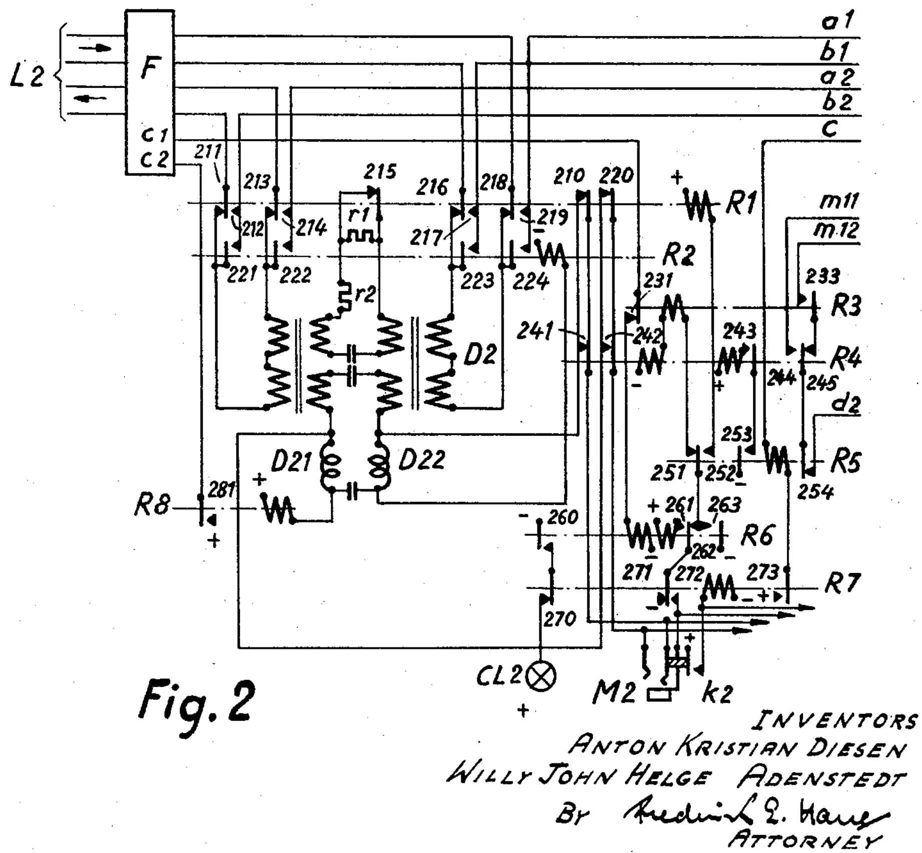
Fig. 2 shows the line equipment for a four-conductor toll line.

In Fig. 2 L2 is a 4-conductor line with an amplifier and relays F, a line equipment R1—R7, a differential transformer D2 and a multiple jack M2 and a calling lamp C12. The resistances *r*1—*r*2 form a line balance and D21—D22 are choke coils. A call from the line 12 causes a signal over the wire *c*1 and the contact 231 through the link winding on the relay for calling and clearing R6. The contacts 260—263 are actuated. The relay R6 is then held in a circuit over the contacts 271 and 261. The calling lamp CL2 is ignited. The operator answers by plugging in an answering cord in the jack M2, whereby the contact *k*2 is closed and the relay R7 is operated. The contacts 270—273 are actuated. The relay R6 releases its armature and the lamp CL2 is extinguished. If the line L2 is interconnected with the line L1 no further alteration will then take place. At calls to the line L2 a calling cord is plugged in the jack M2 and a calling signal is transmitted by connecting a battery over a ringing key in the operating board to the *a*-wire, whereby the relay R8 receives current through the choke D21. The contact 281 closes a circuit over the wire *c*2 due to which a calling signal is transmitted on the line L2. The functions of the relays R1—R5 will be described below in connection with Figs. 3–5.

Fig. 3 shows an operating board OPP with cord circuits AP—BP and a relay chain OPR. To each cord circuit there being two relays for clearing PR1—PR2 and lamps for clearing PLA—PLB and a speaking key K with an auxiliary relay PR3. In the relay chain OPR each operating board OPP has a relay and the relay chain is arranged so that only one relay at a time may be operated. In the board there are two control relays OR1 and OR2, one for the answering cords AP and one for the calling cords BP. Each of the relays OR1 and OR2 has a lower high ohmic winding and an upper low ohmic winding. Then there is a resistance *r*3, by means of which the ringing side and the calling side are separated.

When the operator answers a call, she plugs in the answering cord AP and switches over the speaking key K. The relay PR3 attracts its armature and the contacts 330—339 are actuated. If the call comes from a 2-conductor line according to Fig. 1 no circuit arises for the relay OR1, but if the call is coming from a 4-conductor line according to Fig. 2 OR1 is operated in the following circuit: +, the lower and the upper winding of the relay OR1, the contact 332, the *c*-wire contacts 272, 262 and 251, the winding on the relay R3 and the winding on the relay R4, to minus. The relays R3 and R4 are not operated. The contact 341 is closed. If the calling cord BP then is plugged in the jack of a 4-conductor line, the relay OR2 is operated and the following circuit is completed: +, the contacts 341 and 351, the winding on the relay OPR1, the contacts 303, 305—306, to minus. The relay OPR1 is operated. The contacts 301—305 are actuated. The make-circuit for all the other relays in the relay chain OPR is broken by the contact 305 and the relay OPR1 is kept energized over the contact 304. On the calling side the high ohmic winding on the relay OR1 is short-circuited and the relays R3 and R4 in the line equipment according to Fig. 2 is operated. The contacts 241—245 are actuated. On the ringing side the high ohmic winding on the relay OR2 is disconnected by a resistance *r*3 and only the relay R3 in the line equipment of the called line is operated. The contacts 231—233 are actuated.

Figure 4:
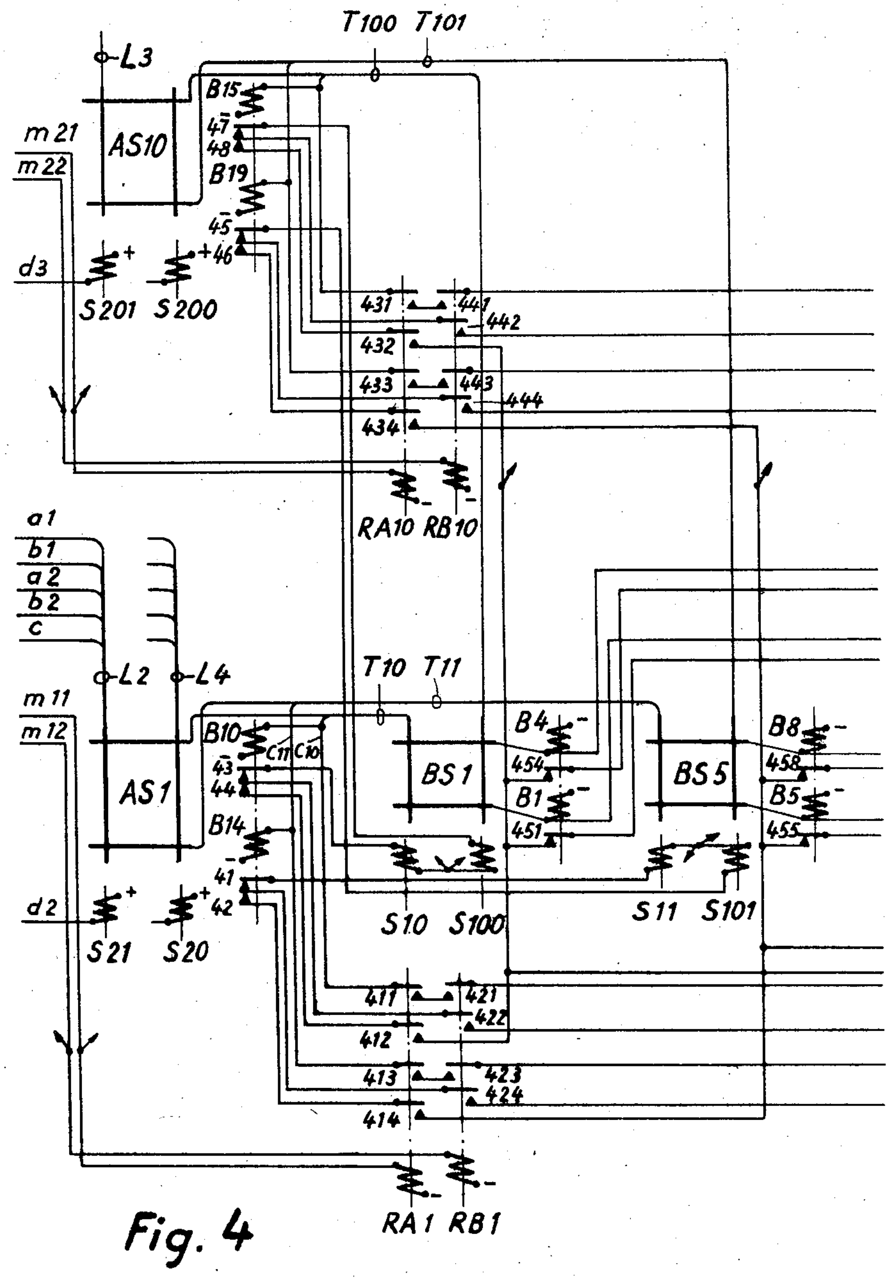
Fig. 4 shows primary cross bar switches AS1—AS10 and secondary cross bar switches BS1—BS5.

When all other boards and cord circuits are blocked said calling line and the called line in the cross bar switches are now marked according to Figs. 4–5. Each 4-conductor line has a selecting magnet in the primary cross bar switches AS1—AS10. The lines in each primary cross bar switch forms a group, for which there are only two groups of relays RA1 (—RA10) for calls from and RB1 (—RB10) for calls to the group. It is assumed that the selecting magnet S21 belongs to the calling line and the selecting magnet S201 to the called line. The operating bars in the primary cross bar switches are connected to selecting bars in the secondary cross bar switches and the two 4-conductor lines are interconnected by selecting an operating bar in AS1 and an operating bar in AS10, which may be interconnected by means of an operating bar in one of the selectors BS1—BS5. As the tandem traffic between the 4-conductor lines is rather small it is assumed that it is sufficient with five operating bars in each primary cross bar switch.

The following circuits are completed:

(*a*) +, the winding on the selecting magnet S21, the wire *d*2, the contacts 254 and 244 in the equipment of the calling line, the wire *m*11, the winding on the relay RA1, to minus.

(*b*) +, the winding on the selecting magnet S201, the wire *d*3, the contacts 254, 245 and 233 in the equipment of the called line, the wire *m*22, the winding on the relay RB10, to minus.

The relays RA1 and RB10 are operated. The contacts 411—414 and 441—444 are actuated. The group relays RA1 and RB1 contain contacts for all five operating bars B10—B14 in the cross bar switch AS1 and the group relays RA10 and RB10 contain contacts for all five operating bars B15—B19 in AS10. The following test circuits are formed: +, the contacts 552 and 555, respectively, 454 and 451, respectively, the contact 412, the contacts 44 and 43, the winding on the selecting magnet S10, the winding on the selecting magnet S100, the contact 47, the contact 442, the windings on the relay V5, the contacts 518, 542, 517—516, to minus, and from +, the contacts 522 and 525, respectively, 458 and 455, respectively, the contact 414, the contacts 42—41, the winding on the selecting magnet S11, the winding on the selecting magnet S101, the contact 45, the contact 444, the windings on the relay V1, the contacts 514, 542, 517—516, to minus. The relays V1—V5 form a relay chain, in which only one relay at a time may be operated. Each of the cross bar switches BS1—BS5 has a relay in the relay chain V1—V5. It is assumed that the relay V1 is operated. The contacts 511—516 are actuated. The contact 512 closes a circuit through the upper winding of the relay VR1, which is operated. The contacts 521—526 are actuated. The relay V1 is kept energized over its contacts 511 and 515 and solely by its upper winding, which has a low resistance, and thus the selecting magnets S11 and S101 now attract their armatures. The following circuits are completed: +, the contact 511, contacts 455 and 458, respectively, the contacts 526 and 523, respectively, the winding on the relay V11 and V14, respectively, the contacts 532 and 536, respectively, the contacts 541, 535—534, to minus. The relays V11—V14 form a relay chain, in which only one relay at a time may be operated. It is assumed that the relay V11 is operated. The contacts 531—534 are actuated. The following circuit is completed: +, the winding on the relay V15, the contacts 531 and 524, the winding on the operating magnet B5, to minus. The operating magnet B5 and the relay V15 are operated. The contacts 541—542 are actuated.

The wires *a*1, *b*1, *a*2, *b*2 and *c* from the lines L2 and L4 are connectable over the spring sets in the primary cross bar switch AS1 to the links T10—T11, which then may be connected over spring sets in the secondary cross bar switches BS1—BS5 to the corresponding links T100—T101 from the other primary cross bar switches. The operating magnets B10—B19 in the primary cross bar switches are connected to the *c*-conductor in the links T10—T11 and T100—T101, respectively.

When the selecting magnets S11 and S101 are operated, the operating magnet B5 is connected to the *c*-conductor in the links T11 and T101, whereby the operating magnets B14 and B19 are connected in parallel to the operating magnet B5 in series with the winding on the relay V15, to plus, and attract their armatures. The wires *c* of the lines L2 and L3 are connected to the operating magnets B14, B19 and B5, whereby the cut-off relays R5 in the calling and the called 4-conductor line become energized over the contacts 273 in parallel to the relay V15 and are operated. The contacts 251—254 are actuated. Then the current of the relays RA1 and RB10 and that of the selecting magnets S21 and S201 is broken. The operating magnets B14 and B19 and B5 are kept in series with the cut-off relays R5. The relays V11, V1 and VR1 and the slow operating relay V15 are released. The contact 251 breaks the current of the control relays OR1 and OR2, which release, and then the relay OPR1 will release its armature and a new communication may begin.

When the cut-off relay R5 in the line equipments according to Fig. 2 is operated, the line relay R3 will release while the relay R4 is kept energized through its right winding over the contacts 253 and 243. The operator has still communication with the two lines L2 and L3 over the circuit cord as long as the speaking key K is operated. When the operator resets the speaking key, the relay PR3 is released and the relays for clearing PR1 and PR2, respectively, are connected in series with the relay R1 over the contacts 252, 261 and 272, the *c*-conductor of the cord, the contact 331 of the answering cord and 330 of the calling cord, respectively in circuits, in which the relays R1 are operated. The relays R1 have, however, a low resistance, and thus the relays for clearing PR1 and PR2 are not operated. The contacts 211—219 and 210 and 220 are actuated, the line L2 being connected to the line L3 over the links T11 and T101 and the operating bar in the cross bar switch BS5 corresponding to the operating magnet B5. By operating the speaking key K the operator may at any time break in upon the existing communication.

When the speaking key K is operated, the operator can interconnect the lines L2 and L3 by operating the relay R2 in a circuit over the choke D22, the contact 210, the *w*-wire in the link AP, the contact 333, to plus in a particular key pertaining to the operator's set OPC. Then the operator will be connected for listening.

When a signal for clearing is received over one of the lines, the relay R6 is operated. The contacts 260—263 are actuated. The relay R6 is held over the contacts 261 and 272 and 330 and 331, respectively, in series with the relay for clearing PR1 and PR2, respectively, which is operated and ignites the lamp for clearing PLB and PLA, respectively.

We claim:

A telephone system comprising, in combination, a manually operable switch board with a plurality of three-conductor cord circuits including sleeve conductors and at least one operator's position circuit, a plurality of 2-wire trunk lines and a plurality of 4-wire trunk lines connected to said board, multiple jacks interconnecting a calling one of said trunk lines with the called line among said trunk lines over said cord circuits, each of said 4-wire trunk lines including a marking relay and a break relay, a number of cross-bar switches for interconnecting a calling 4-wire trunk line with a called 4-wire trunk line, a common marker for the operation of said cross-bar switches, at least one control relay in the operator's position circuit, a relay chain in which only one relay at a time is operable, said relay chain including one connecting relay for the operator's position circuit, said control relay operating in circuits over the sleeve-conductors of a cord circuit when two 4-wire trunk lines are connected to the operator's position circuit over the cord circuit, said connecting relay of the operator's position circuit being operated by said control relay, switching circuits including the cord conductors to operate said marking relay for the calling and the called trunk line, circuits closed by said marking relays to mark the calling and the called trunk line in said marker, and relays in the marker setting up a communication over said cross-bar switches between the two trunk lines, said break relays of the trunk lines being operated by said communication and releasing said marking relays, control relay and connecting relay.

References Cited in the file of this patent

UNITED STATES PATENTS

| | | |
|---|---|---|
| 1,647,796 | Glezen | Nov. 1, 1927 |
| 1,717,893 | Raymond | June 18, 1929 |
| 2,568,733 | Henquet | Sept. 25, 1951 |